United States Patent
Hannig et al.

(10) Patent No.: US 11,279,070 B2
(45) Date of Patent: Mar. 22, 2022

(54) CARRIER MATERIAL FOR A DECORATED WALL OR FLOOR PANEL

(71) Applicant: Akzenta Paneele + Profile GMBH, Kaisersesch (DE)

(72) Inventors: Hans-Jürgen Hannig, Bergisch Gladbach (DE); Egon Hoff, Mastershausen (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 132 days.

(21) Appl. No.: 16/348,180

(22) PCT Filed: Nov. 24, 2017

(86) PCT No.: PCT/EP2017/080372
§ 371 (c)(1),
(2) Date: Aug. 29, 2019

(87) PCT Pub. No.: WO2018/096104
PCT Pub. Date: May 31, 2018

(65) Prior Publication Data
US 2020/0164561 A1    May 28, 2020

(30) Foreign Application Priority Data

Nov. 25, 2016 (EP) ..................... 16200678

(51) Int. Cl.
| | | |
|---|---|---|
| *B32B 3/10* | (2006.01) | |
| *B29C 48/154* | (2019.01) | |
| *B29C 48/07* | (2019.01) | |
| *B29C 48/00* | (2019.01) | |
| *B29C 43/48* | (2006.01) | |
| *B32B 27/32* | (2006.01) | |
| *B44C 5/04* | (2006.01) | |
| *E04F 13/08* | (2006.01) | |
| *E04F 15/10* | (2006.01) | |
| *B29K 23/00* | (2006.01) | |
| *B29K 105/12* | (2006.01) | |
| *B29L 31/00* | (2006.01) | |

(52) U.S. Cl.
CPC ............ *B29C 48/154* (2019.02); *B29C 43/48* (2013.01); *B29C 48/0011* (2019.02); *B29C 48/07* (2019.02); *B32B 27/32* (2013.01); *B44C 5/0453* (2013.01); *E04F 13/0866* (2013.01); *E04F 15/107* (2013.01); *B29K 2023/12* (2013.01); *B29K 2105/12* (2013.01); *B29L 2031/732* (2013.01); *B29L 2031/776* (2013.01); *B32B 2471/00* (2013.01); *B32B 2607/00* (2013.01); *B44C 5/0461* (2013.01)

(58) Field of Classification Search
None
See application file for complete search history.

(56) References Cited

U.S. PATENT DOCUMENTS

| | | | |
|---|---|---|---|
| 4,540,624 A | 9/1985 | Cannady, Jr. | |
| 2006/0264544 A1* | 11/2006 | Lustiger ................ | B29C 48/05 524/284 |
| 2009/0202810 A1 | 8/2009 | Kimberly | |
| 2018/0272796 A1 | 9/2018 | Hannig | |

FOREIGN PATENT DOCUMENTS

| | | |
|---|---|---|
| CN | 106103127 A | 11/2016 |
| DE | 3511046 C2 | 1/1996 |
| DE | 202016101306 U1 | 4/2016 |
| EP | 2829415 A1 | 1/2015 |
| EP | 3239240 A1 | 11/2017 |
| EP | 3345774 A1 | 7/2018 |
| EP | 3348418 A1 | 7/2018 |

OTHER PUBLICATIONS

International Preliminary Report on Patentability issued in PCT/EP2017/080372 dated Jun. 6, 2019.
Office Action regarding Chinese Patent Application No. 201780084614.4, dated Aug. 25, 2020.
Office Action regarding parallel European Patent Application No. 17801481.7, dated Jul. 15, 2021.

* cited by examiner

*Primary Examiner* — Christopher M Polley
(74) *Attorney, Agent, or Firm* — Harness, Dickey & Pierce, P.L.C.

(57) ABSTRACT

The invention relates to a carrier material for producing a carrier (12) for a decorated wall or floor panel (10), wherein the carrier material (14) comprises a matrix material having a plastic, a solid material and a fiber material, wherein the solid material is formed by an inorganic material in a proportion of at least 50 wt. %, in particular at least 80 wt. %, in particular at least 95 wt. % in relation to the solid material, wherein the matrix material is present in a quantity of ≥20 wt. % to ≤60 wt. %, in particular ≥28 wt. % to ≤48 wt. %, in particular ≥35 wt. % to ≤41 wt. % in relation to the carrier material, and wherein the solid material is present in a quantity of ≥25 wt. % to ≤65 wt. %, in particular ≥33 wt. % to ≤53 wt. %, in particular ≥40 wt. % to ≤46 wt. % in relation to the carrier material, and wherein the fiber material is present in a quantity of >1 wt. % to ≤35 wt. %, in particular ≥7 wt. % to ≤30 wt. %, approximately ≥14 wt. % to ≤21 wt. % in relation to the carrier material, and wherein the matrix material, the fiber material and the solid material together are present in a quantity of ≥89 wt. %, approximately ≥95 wt. %, in particular ≥97 wt. % in relation to the carrier material (20).

14 Claims, 1 Drawing Sheet

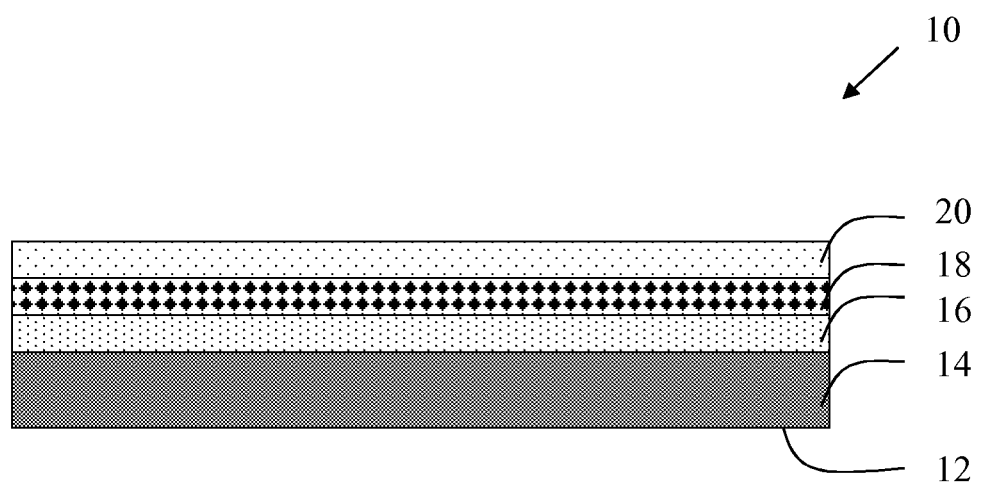

CARRIER MATERIAL FOR A DECORATED WALL OR FLOOR PANEL

CROSS-REFERENCE TO RELATED APPLICATIONS

This application is a 371 U.S. National Phase of International Application No. PCT/EP2017/080372 filed on Nov. 24, 2017. This application claims the benefit of European Patent Application No. 16200678.7, filed on Nov. 25, 2016. The entire disclosures of the above applications are incorporated herein by reference.

FIELD

The present disclosure relates to a carrier material for producing a decorated wall or floor panel. The present disclosure further relates to a decorated panel comprising such a carrier material and to a method for producing a decorated wall or floor panel.

BACKGROUND

This section provides background information related to the present disclosure which is not necessarily prior art.

Decorated panels are known per se, wherein the term wall panel also means panels which are suitable as a ceiling or door lining. They usually consist of a carrier or core of a solid material, such as a wood material, which is provided on at least one side with a decorative layer and a covering layer and optionally with further layers, such as a wearing layer disposed between the decorative and the covering layer. The decorative layer is usually a printed paper impregnated with a resin. The top layer and the remaining layers are usually made of resin, too.

DE 20 2016 101 306 U1 describes a carrier material for producing a carrier for a decorated wall or floor panel, wherein the carrier material comprises a plastic-containing matrix material and a solid material, wherein the solid material, based on the solid material, is formed to at least 50 wt.-%, in particular at least 80 wt.-% in particular at least 95 wt.-%, of talcum, wherein the matrix material, based on the carrier material, is present in an amount from ≥30 wt.-% to ≤70 wt.-%, in particular from ≥40 wt.-% to ≤60 wt.-%, and wherein the solid material, based on the carrier material, is present in an amount from ≥30 wt.-% to ≤70 wt.-%, in particular from ≥40 wt.-% to ≤60 wt.-%, and wherein the carrier material and the solid material together, based on the carrier material, are present in an amount from ≥95 wt.-%, in particular ≤99 wt.-%. However, in this document there is no reference to the use of fibers in the carrier material.

US 2006/264544 A1 further describes fiber-reinforced polypropylene compositions which, in addition to polypropylene, comprise organic reinforcing fibers, an inorganic filler and a dye. However, this document gives no indication of the use of a composition as a carrier material for a floor panel.

From document EP 2 829 415 A1 a method for producing a decorated wall or floor panel is known in which, starting from a granular carrier material, a carrier and then a panel is formed. In such a method, for example, a WPC can be used as a carrier material.

Document DE 35 11 046 C2 describes an antistatic, heat and pressure-strengthened laminate consisting of a lower core layer comprising a plurality of fibrous layers and a decorative covering layer disposed on the core layer and including cellulose fibers.

Such solutions may under certain circumstances still offer potential for improvement. Potential for improvement can be found here in particular with regard to the stability, the moisture resistance and the heat resistance.

SUMMARY

This section provides a general summary of the disclosure, and is not a comprehensive disclosure of its full scope or all of its features.

It is therefore the object of the present disclosure to provide an improved wall or floor panel and/or to provide a method for producing the same.

This object is achieved by a carrier material according to claim 1. This object is further achieved by a panel according to claim 11 and by a method according to claim 12. Preferred embodiments of the disclosure are provided in the dependent claims, in the description or in the figures, wherein further features described or shown in the dependent claims or in the description or in the figures may individually or in any combination represent an object of the disclosure, if the opposite is not clearly obvious from the context.

The disclosure proposes a carrier material for producing a carrier for a decorated wall or floor panel. The carrier material includes a plastic-containing matrix material, a solid material and a fiber material, wherein the solid material, based on the solid material, is formed to at least 50 wt.-%, in particular at least 80 wt.-%, in particular at least 95 wt.-%, for example ≥99 wt.-%, by an inorganic, for example mineral, material, such as for example, exclusively talcum, wherein the matrix material, based on the carrier material, is present in an amount from ≥20 wt.-% to ≤60 wt.-%, in particular from ≥28 wt.-% to 48 wt.-%, in particular from ≥35 wt.-% to ≤41 wt.-%, and wherein the solid material, based on the carrier material, is present in an amount from ≥25 wt.-% to ≤65 wt.-%, in particular from ≥33 wt.-% to ≤53 wt.-%, in particular from ≥40 wt.-% to ≤46 wt.-%, and wherein the fiber material, based on the carrier material, is present in an amount from >1 wt.-% to ≤35 wt.-%, in particular from ≥7 wt.-% to ≤30 wt.-%, such as from ≥14 wt.-% to ≤21, and wherein the matrix material, the fiber material and the solid material together, based on the carrier material (20), are present in an amount from ≥89 wt.-%, such as ≥95 wt.-%, in particular ≥97 wt.-%.

It could surprisingly been shown that such a carrier material enables the production of a wall or floor panel with a very good stability, wherein, in addition, a very good moisture resistance can be achieved, in particular with reduced moisture or heat-induced swelling.

The aforementioned carrier is in particular suited for use in a decorated wall or floor panel.

In the sense of thedisclosure, the term "decorated wall or floor panel" or "decorative panel" is to be understood in particular as wall, ceiling, door or floor panels comprising a decoration replicating a decoration template and applied onto a carrier plate. Decorative panels are used in a variety of ways both in the field of interior design of rooms and for decorative claddings of buildings, for example in exhibition stand construction. Herein, the decorative panels often comprise a decoration intended to replicate a natural material.

Examples of such replicated natural materials or decoration templates are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

Correspondingly, a "decoration template" in the sense of the present disclosure may be understood in particular as such an original natural material or at least a surface thereof which is to be imitated or replicated by the decoration.

A "carrier" may in particular be understood as a layer which serves as a core or as a base layer in a finished panel. For example, the carrier may already impart an appropriate stability to the carrier or may contribute thereto.

Accordingly, a carrier material can be understood as a material which forms the carrier at least to a predominant part. In particular, the carrier may consist of the carrier material.

Furthermore, the term inorganic is in particular a collective term for chemical elements other than carbon, for carbon-free compounds other than the carbon oxides carbon dioxide and carbon monoxide as well as the carbonates and carbides and for systems or processes of inanimate nature.

An above-described carrier material comprises a plastic-containing matrix material, a solid material and a fiber material.

The matrix material serves in particular to accommodate or embed the solid material and the fiber material in the finished carrier. The matrix material in this case comprises plastic or a plastic mixture.

Depending on the desired field of application and the desired characteristics of the panel, the proportions of matrix material, fiber material and solid material may be selectable. As a result, a good adaptability to the desired field of application is enabled. In principle, however, it may be preferred that the proportion of the solid material is greater than or equal to the proportion of the matrix material and that the proportion of the fiber material is less than the proportion of the matrix material and less than the proportion of the solid material.

With respect to a matrix material comprising a plastic, for example consisting of a plastic or a plastic mixture, it is provided that it is present in an amount, based on the carrier material, from ≥20 wt.-% to ≤60 wt.-%, in particular from ≥28 wt.-% to ≤48 wt.-%, in particular from ≥35 wt.-% to ≤41 wt.-%.

Examples of plastics which may preferably serve as matrix material include in particular thermoplastic materials, for example polyethylene or polypropylene or mixtures of the aforementioned plastics. It may further be preferred that the matrix material comprises polypropylene, wherein the polypropylene may comprise a mixture of a homopolymer and a copolymer. In particular, a mixture of a homopolymer and a copolymer may provide particularly advantageous characteristics for the matrix material in that, for example, they can be formed to a carrier in a range from ≥180° C. to ≤220° C., so that a particularly effective process control, for example with exemplary line speeds in a range of 6 m/min, can be enabled. Furthermore, the matrix material may in principle be free of an adhesion promoter.

As a copolymer, for example, a copolymer can be used, which is composed of propylene and ethylene as monomer units, for example consists thereof, wherein the density of the copolymer may be greater than or equal to the density of the homopolymer.

By use of a homopolymer, in particular a high melt flow rate can be enabled, wherein the melt flow rate of the homopolymer may in particular be greater than that of the copolymer. This can enable a particularly good formability of the carrier during the manufacturing process. Furthermore, the homopolymer can thereby enable a particularly good embedding of the solid material. In contrast, the copolymer can in particular serve the mechanical strength of the carrier material or of the carrier, since a copolymer often has a comparatively high hardness, in particular with respect to the homopolymer.

With respect to the distribution of homopolymer and copolymer, it may be preferable that the homopolymer with respect to the polypropylene and optionally with respect to the matrix material is present in a proportion from ≥10 wt.-% to ≤40 wt.-%, for example in a proportion from ≥20 wt.-% to ≤30 wt.-%, and/or that the copolymer with respect to the polypropylene is present in a proportion from ≥60 wt.-% to ≤90 wt.-%, such as in a proportion from ≥70 wt.-% to ≤80 wt.-%, in particular wherein the polypropylene consists of the homopolymer and the copolymer.

It may further be preferred that the matrix material comprises a mixture of polypropylene and polyethylene. The polypropylene may in particular be a homopolymer. The polyethylene can be configured in particular as HDPE. The mixing ratio of polypropylene to polyethylene may be, for example, in a range of from 40 wt.-% to 60 wt.-% to 60 wt.-% to 40 wt.-%, for example in a range from 50 wt.-% to 50 wt.-%. In order to obtain a particularly homogeneous mixture and a stable carrier, in this case the provision of an adhesion promoter may be particularly preferred. For example, a copolymer of polyethylene and polypropylene may serve this purpose.

The solid material, based on the carrier material, is present in an amount from ≥25 wt.-% to ≤65 wt.-%, in particular from ≥33 wt.-% to ≤53 wt.-%, in particular from ≥40 wt.-% to ≤46 wt.-%.

With respect to the solid material, it may have a particle size of less than 800 µm, preferably less than 600 µm. As a result, the solid can be distributed very finely in the matrix material.

The solid or the solid material is formed as an inorganic solid material. Examples include particularly preferably talcum or chalk, wollastonite, stone flour or other minerals.

It may be particularly preferred if the solid comprises talcum, for example consists thereof.

With regard to the use of talcum as a solid, it may be advantageous that, in particular in this embodiment, a high stability is achieved. In addition, such a carrier material can enable an improved moisture resistance, in particular with a reduced moisture or heat-induced swelling. Talcum is understood in a manner known per se as a magnesium silicate hydrate, which may have, for example, the chemical formula $Mg_3[Si_4O_{10}(OH)_2]$. It may be preferred, when the specific surface density according to ISO 4352 (BET) of the talcum particles is in a range from ≥4 $m^2$/g to ≤8 $m^2$/g, such as in a range from ≥5 $m^2$/g to ≤7 $m^2$/g. Furthermore, it may be advantageous, if talcum is present at a bulk density according to DIN 53468 in a range from ≥0.15 g/$cm^3$ to ≤0.45 g/$cm^3$, such as in a range from ≥0.25 g/$cm^3$ to ≤0.35 g/$cm^3$. It can preferably be provided that talcum is present in the form of particles having a particle size $D_{50}$ in a range from ≥3 µm to ≤6 µm, preferably in a range from ≥4 µm to ≤5 µm, such as 4.5 µm, and/or that talcum is present in the form of particles having a particle size $D_{98}$ in a range from ≥10 µm to ≤30 µm, preferably in a range from ≥15 µm to ≤20 µm, such as 17 µm. In order to determine the particle size distribution, basically the generally known methods, such as laser diffractometry, can be used, by means of which particle sizes in the range of a few nanometers up to several millimeters can be determined. By means of this method it is also possible to determine $D_{50}$ and $D_{98}$ values which respectively indicate that 50% ($D_{50}$) or 98% ($D_{98}$) of the measured particles are smaller than the respective specified value.

As a further solid, for example, a wood material such as wood flour, or another material, such as a component of the rice plant, such as the rice spelt, the rice stem and the rice husk, or cellulose may be present.

With regard to the use of wood as a solid, it is therefore possible to design a so-called WPC carrier which is basically known and has great acceptance. Thus, in particular in this embodiment, a carrier according to the disclosure can be obtained by a modification of products known per se.

For example, for wood, in particular for wood flour, it may be provided that its particle size is between >0 µm and ≤600 µm with a preferred particle size distribution $D_{50}$ of ≥400 µm.

In principle, the solids may, without being limited thereto, be present in the form of shreds, chips, flour or grains, for example in the form of a powder.

In a particularly preferred embodiment, it may be advantageous that the solid material, based on the solid material, is formed by inorganic solids, such as talcum, to at least 50 wt.-%, such as at least 80 wt.-%, in particular at least 90 wt.-%, for example, at least 99 wt.-%.

With regard to the above-described fiber material provided in the carrier material, it is provided that this fiber material is present in the carrier material, based on the carrier material, in an amount from >1 wt.-% to ≤35 wt.-%, in particular from ≥7 wt.-% to ≤30 wt.-%, such as from ≥14 wt.-% to ≤21 wt.-%. It has been shown that with a carrier material described above, which as main constituents in addition to the fiber material comprises the matrix material and the solid material, a significantly increased stability can be achieved.

In particular, it has been shown that the fracture value of a carrier or a panel, which is formed from such a carrier material, can be significantly increased. Thereby, the stability can be significantly increased even if the fiber material is present in the carrier material in comparatively small amounts, such as, based on the carrier material, in an amount from >14 wt.-% to ≤21 wt.-%, in particular from ≥15 wt.-% to ≤20 wt.-%. As a result, further characteristics of the carrier, such as a suitable impact sound insulation or the like, can be maintained, which may allow a particularly advantageous characteristics profile of a carrier configured from a carrier material of this kind.

The same applies to a significant improvement of a deformation under permanent load, which can be demonstrated for example in the so-called wheelchair test. In particular, such an improved stability with respect to a deformation can be advantageous with respect to a long-term stability, which can enable a very good appearance and a very good haptic even after a relatively long use of the panel.

In addition, it has been found that a previously described carrier material allows the production of a carrier, as described in detail below, wherein the carrier comprises a particularly good and in particular smooth surface. This can be advantageous in particular for the application of a decoration or a decorative layer, for example when the decoration is printed, as described in detail below. In particular in this embodiment a high-quality surface image of the decoration can be achieved.

Basically, the mechanical characteristics, such as with respect to the tensile modulus, the flexural modulus, the tensile strength, the elongation at break, the bending stress, the ball impression hardness and the impact strength may all advantageously designed for a floor panel.

It may be particularly preferred that the fiber material comprises fibers having a length in a range from ≥1 mm to ≤10 mm, preferably in a range from ≥3 mm to ≤7 mm. Surprisingly, it has been found that such fibers can provide a high stability, wherein, however, significant advantages in the manufacturability can be achieved.

In this case, such an embodiment further offers the advantage of improved manufacturability. It has surprisingly been found that in particular a pretreatment of the carrier material or a production thereof in an extruder by use of a fiber material in this length range can be carried out particularly advantageously and without problems.

Basically, as is known per se, the fibers have a diameter or a thickness which is smaller than the length, in particular smaller than the aforementioned length ranges.

It may be particularly preferred that the fiber material comprises fibers having a maximum diameter of <100 µm, for example from ≥9 µm to ≤100 µm, for example from ≥10 µm to ≤77 µm.

More preferably, the fibers may have a thickness in a range from ≥1 dtex to ≤10 dtex, for example, in a range from ≥1.2 dtex to ≤8.5 dtex. This embodiment, too, can enable a significant improvement in stability, in particular in the previously defined carrier material comprising a matrix material, a solid material and a fiber material in the above-described proportions, wherein a processability is not or not significantly deteriorated by the presence of the fibers. Thus, even in this embodiment a very high-quality product without production-specific disadvantages can be achieved.

It may further be preferred that the fiber material comprises fibers selected from the group consisting of plant, animal, mineral or even synthetic fibers. Examples of plant fibers include cellulose fibers, lignose fibers as well as fibers from straw, maize straw, bamboo, leaves, algae extracts, hemp, cotton or oil palm fibers. Examples of animal fiber materials are keratin-based materials such as wool or horsehair. From the aforementioned fibers, for example, cellulose may be of particular advantage. Examples of mineral fiber materials are mineral wool or glass wool.

Examples of synthetic fibers include glass fibers or plastic fibers, such as fibers of polyester, wherein polyethylene terephthalate (PET) fibers may be particularly preferred as polyester fibers due to their processability and the stability characteristics of the carrier produced. For example, polyester fibers can be obtained by cutting, such as chopping, a nonwoven polyester material. Other fibers may be those of polycarbonate, polyethylene or polyamide or even LCP fibers or polyacrylonitrile fibers.

Plant and animal fibers may have the advantage of a particularly good ecological balance, whereas mineral fibers or synthetic fibers may have advantages in terms of heat and moisture resistance.

Insofar as the fiber material comprises synthetic fibers, it may be advantageous that the melting temperature of the plastic fibers is higher than the melting temperature of the matrix material. This embodiment can in turn bring about manufacture-specific advantages. Because for producing a carrier from the previously defined carrier material, it may be advantageous to melt the carrier material or the matrix material and to form a carrier under pressure, as described below. In this embodiment it can be prevented in such a process that the plastic fibers also melt, which could at least partially cancel the above-described advantages of the fiber material. Thus, in particular in this embodiment, a well processable manufacturing process can be enabled while ensuring the desired characteristics. Exemplary plastic fibers include, for example, the aforementioned synthetic or polymeric fibers.

By restricting the materials of the carrier material and thus by a small number of materials for producing the carrier, the carrier can be produced particularly cost-efficient. In addition, the process control of the production of a carrier or a panel can be very easy, so that the production, too, is possible easy and cost-efficient.

A carrier described above, in particular comprising an inorganic, for example mineral, material, such as talcum, as a solid in a matrix material, as described above, further offers in particular the advantage of a good moisture resistance. In particular, by use of a carrier material as described above swelling of a panel produced from the carrier material when exposed to moisture can be significantly reduced or even completely prevented. Furthermore, an improved heat dimensional resistance can be achieved, for example, a heat-related expansion can be prevented or at least significantly reduced and the use of talcum can further be advantageous in terms of the elastic modulus and the creep resistance.

Thus, it may be advantageous that the carrier material consists to a large extent of the solid material and the matrix material and the fiber material. Particularly preferably, it can be provided that the matrix material and the fiber material and the solid material together, based on the carrier material, are present in an amount of ≥89 wt.-%, such as ≥97 wt.-%, for example in an amount of 100 wt.-%, so that the carrier material consists of the matrix material and the solid material and the fiber material.

Particularly preferably, the carrier material may comprise a polymeric, in particular a thermoplastic plastic, for example a plastic mixture, such as polypropylene as a mixture of a homopolymer and a copolymer, as described above, as a matrix material, talcum as a solid material and polyester fibers as a fiber material. In particular, in this embodiment a production can be particularly cost-effective and the process control can be particularly easy. Here, the weight ratio of polypropylene to talcum to polyester fibers can be 33:43:17, wherein the above components may constitute 89 wt.-% to 100 wt.-% of the carrier material.

Furthermore, the carrier material may optionally comprise between ≥0 wt.-% and ≤11 wt.-% of further additives, such as such as flow aids, thermo stabilizers or UV stabilizers. By way of example, as additives of generally ≥0 wt.-% one or any selection of a processing stabilizer in an amount from 0.2 to 0.8 wt.-%, such as 0.5 wt.-%, an adhesion promoter in an amount from 1 to 4 wt.-%, such as 2.5 wt.-%, a UV stabilizer in an amount of from 1 to 4 wt.-%, such as 2.5 wt.-%, and a flow aid in an amount from 1 to 2 wt.-%, such as 1.5 wt.-%, respectively based on the carrier material, may be present.

The carrier material offers the advantage that panels produced thereby have a very good stability, so that the risk of damages to the panel during transport and during use is extremely low. This can be achieved in particular by the solid material, i.e. in particular by the inorganic material contained.

A carrier made of the carrier material can furthermore be provided with a decoration without any problems. For example, such a carrier is very well suited for printing in particular by means of a digital printing method, such as an inkjet printing process. As a result, such carriers can be easily provided with a high-quality decoration which allows the production of a high-quality panel.

With regard to further technical features and advantages of the carrier, reference is hereby explicitly made to the description of the panel, the method and to the figures.

The present disclosure further relates to a decorated panel, in particular a decorated wall or floor panel comprising a carrier and a decorative layer applied to the carrier, wherein in particular a covering layer provided with a structure is applied onto the decorative layer. Such a panel is characterized in that the carrier is configured as described in detail above. With respect to the specific features reference is therefore made to the above description.

The edge regions of a panel can be structured or profiled in order to provide in particular detachable connecting elements. In this regard, in the case of a profiling in the sense of the disclosure it can be provided that a decorative and/or functional profile is introduced by means of suitable material-removing tools at least in a part of the edges of the decorative panel. A functional profile means, for example, the introduction of a tongue and/or groove profile in an edge to make decorative panels connectable to each other via the introduced profilings. In particular in the case of tongue and/or groove profiles, elastic materials are advantageous, since by sole use thereof profiles can be produced, which are particularly easy to handle and stable. Thus, in particular no further materials are necessary to produce the connecting elements.

In summary, the above-described panel has the advantage of a high dimensional stability with respect to heat and moisture influence with simultaneously good mechanical characteristic or a good mechanical stability and light weight. Furthermore, such a panel can be very stable and at the same time have a high elasticity, which may be advantageous in particular for an effective and cost-effective design of connecting elements at the edge region of the carrier and furthermore with regard to footfall sound insulation.

With respect to further technical features and advantages of the panel, reference is hereby explicitly made to the description of the carrier material, the method and the figures.

Subject-matter of the present disclosure is furthermore a method for producing a decorated wall or floor panel, comprising the method steps:
a) providing a pourable carrier material, as described in detail above,
b) in particular placing the carrier material between two belt-like conveying means,
c) forming the carrier material under the action of temperature and pressure while forming an in particular web-shaped carrier,
d) optionally cooling the carrier,
e) optionally applying a decoration subsurface onto at least a portion of the carrier,
f) applying a decorative layer replicating a decoration template onto at least a portion of the carrier, and
g) applying a covering layer onto at least a portion of the decorative layer.

As will be readily apparent to those skilled in the art, method steps a) to c) serve to produce a carrier for a decorated wall or floor panel, that is, for a defined part of a method for producing a decorated wall or floor panel, wherein the latter may be finished by the additional steps d) to g).

With respect to the advantages of the carrier, reference is made to the above description.

In accordance with method step a) a granular carrier material is provided, wherein the carrier material comprises a plastic-containing matrix material, a fiber material and a solid material. The granular carrier material can be provided in prefabricated carrier material particles, wherein the particles already comprise solid and fiber material embedded within the matrix material by melting. Such carrier material particles may be obtained, for example, by an extrusion process.

In other words, it can be provided that method step a) comprises the processing of a raw material mixture in an extruder, in particular a twin-screw extruder. In this case, particles of the carrier material can be obtained which have a maximum diameter in the millimeter range, for example in a range from ≥1 mm to ≤10 mm.

In this respect, it may be provided that method step a) includes that the matrix material, the fiber material and the solid material are each introduced as an independent or as a respective different phase into an extruder and are processed therein as a raw material mixture. In this embodiment, thus, a mixture of the fiber material, the matrix material and the solid material can be obtained in the extruder and by further processing particles of the carrier material can be obtained. This embodiment allows a particularly simple process control and thus a particularly simple adaptability. The latter applies in particular if the ratio of the individual components relative to one another is to be changed.

Alternatively, it can be provided that method step a) comprises placing a prefabricated composite material of the fiber material and the matrix material in the extruder and processing it in the extruder with the solid material as a raw material mixture. In this embodiment, therefore, first the fiber material is incorporated into the matrix material in order to obtain a composite material comprising the matrix material which includes fiber material dispersed therein. This composite material can then be mixed with the solid material and processed in the extruder. It has surprisingly been found that in particular in this embodiment, a carrier can be formed which has a particularly smooth surface and thus is particularly suited, for example, for a later application of a decorative layer. In addition, this embodiment can be implemented with a smaller number of scattering heads, which can offer plant-related advantages.

It may further be preferred that the fibers are supplied into an area of the extruder where only minor shear forces are applied. This can counteract damages to the fibers.

A granular carrier material may be understood as a solid or a bulk material of a solid which comprises a plurality of solid particles, such as grains or beads, or consists thereof. By way of example, but not limited thereto, grainy or powdered materials can be mentioned here. The carrier material is the material from which the carrier is formed, in particular of which the carrier consists. With respect to the carrier material used it is referred to the above description of the panel.

According to process step b), the carrier material is placed between two belt-like conveying means and formed according to process step c) under the action of temperature and pressure while forming a web-shaped carrier.

For example, the granular carrier material can be placed between two belt-like conveying means, which are moved circumferentially, so that between the conveying means the carrier can be formed by the action of pressure and heat, in particular with at least partial melting the matrix material. The carrier material can be applied onto the lower conveyor and then be restricted by the lower and the upper conveying means. For example, the conveying means can pass through a plurality of pressing devices and heating devices and optionally cooling devices in order to form the carrier in a suitable manner. The belt-like conveying means may be at least partially made of polytetrafluoroethylene (PTFE). For example, the belts may be formed entirely of polytetrafluoroethylene, or glass fiber reinforced plastic belts or steel belts with a polytetrafluoroethylene coating may be used.

In a further step, for example, after placing the carrier material a forming process of the carrier material placed between the belt-like conveying means under the action of temperature or heat takes place. In this method step, thus, by the applied thermal energy or heat a melting or softening of the carrier material or at least a part thereof takes place, whereby, for example, the granules can become formable. In this state, it can fill the receiving space which is formed between the conveying means and thus form a web-shaped carrier which can be further treated.

As pressing means, for example, rollers and/or a twin belt press can be used. Insofar as a twin belt press is used as a pressing device, in this as a final pressing step in the carrier production in particular the surface characteristics of the carrier can be adjusted with low pressure and low compression within a very narrow range, such as with a compression from >0% to ≤7%, for example 5%.

After passing through the pressing and/or heating devices, such as a twin belt press, the carrier produced can be stored initially in a web-shaped form or as separated plate-like carriers as an intermediate product and the method can be completed temporarily. Preferably, however, further treatment steps follow immediately.

For producing a finished panel, the previously produced carrier is subsequently provided with a decoration or a decorative layer and this is coated with a protective layer or a wearing or covering layer.

In order to apply a decoration or a decorative layer, first according to method step e) a decoration subsurface can be applied onto at least a portion of the carrier. For example, in particular for printing processes, initially a primer can be applied as a decoration subsurface, for example in a thickness from ≥10 μm to ≤60 μm. In this case, a liquid radiation-curing mixture based on a urethane or a urethane acrylate, optionally with one or more of a photoinitiator, a reactive diluent, a UV stabilizer, a rheology agent such as a thickener, a radical scavenger, a flow control agent, a defoamer or a preservative, a pigment and/or a dye can be used as a primer.

In addition to the primer, a white colored undercoat may be applied. For example, the undercoat may include polyurethane, for example be formed as a polyurethane varnish, and, for example, can be provided with white pigments.

In addition to the use of a primer it is possible to apply the decoration onto a decorative paper printable with a corresponding decoration, which may be provided for example by means of a resin layer as an adhesion promoter previously applied to the carrier. Moreover, a resin can be applied as a printing subsurface onto the paper, which as a resin component may comprise at least one compound selected from the group consisting of melamine resin, formaldehyde resin, urea resin, phenol resin, epoxy resin, unsaturated polyester resin, diallyl phthalate or mixtures thereof.

Subsequently, the decoration or the decorative layer according to method step f) can be produced in particular by a printing process, wherein flexographic printing, offset printing or screen printing processes and in particular digital printing techniques such as inkjet method or laser printing method are suitable. The decorative layer can be formed from an in particular radiation-curable paint and/or ink. For example, a UV-curable paint or ink may be used.

It is also possible, if appropriate, first, for example prior to the printing process, to carry out a pretreatment of the carrier for electrostatic discharge and, if appropriate, subsequent electrostatic charging. This may in particular serve to avoid the occurrence of blurring in the course of the application of the decoration.

With respect to the wearing or covering layer, which is applied according to method step g) on top of the decorative layer it may be provided that it is laid on the printed carrier as a pre-produced overlay layer, for example based on melamine, and bonded to the carrier by pressure and/or heat exposure. Furthermore, it may be preferred that likewise a radiation-curable composition, such as, for example, a radiation-curable lacquer, such as an acrylic lacquer, is applied to form the wearing and/or covering layer. Here, it can be provided that the wearing layer includes hard materials such as titanium nitride, titanium carbide, silicon nitride, silicon carbide, boron carbide, tungsten carbide, tantalum carbide, alumina (corundum), zirconium oxide or mixtures thereof, in order to increase the wear resistance of the layer. In this case, the application can take place for example by means of rollers, such as rubber rollers or by means of pouring devices.

In particular, a structure, in particular a surface structure matching with the decoration, can be introduced into the covering layer by introducing pores. This can be realized, for example, by embossing corresponding structures.

It may be particularly preferred if the covering layer is printed onto the surface, for example by means of an inkjet printer and/or by multiple application, since thereby highly accurate structures can be produced.

DRAWINGS

The drawings described herein are for illustrative purposes only of selected embodiments and not all possible implementations, and are not intended to limit the scope of the present disclosure.

The disclosure is explained in more detail below with reference to the FIGURE and an exemplary embodiment.

FIG. 1 schematically shows a view of a decorated panel comprising a carrier 12 made of a carrier material according to the disclosure;

Corresponding reference numerals indicate corresponding parts throughout the several views of the drawings.

DETAILED DESCRIPTION

Example embodiments will now be described more fully with reference to the accompanying drawings.

FIG. 1 schematically shows a view of a decorated wall or floor panel 10. The wall or floor panel 10 comprises a carrier 12 formed from a carrier material 14.

It is provided that the carrier material 14 comprises a plastic-containing matrix material, a solid material and a fiber material, wherein the solid material, based on the solid material, is formed to at least 50 wt.-%, in particular at least 80 wt.-%, in particular at least 95 wt.-%, by an inorganic material, in particular talcum, wherein the matrix material, based on the carrier material, is present in an amount from ≥20 wt.-% to ≤60 wt.-%, in particular from ≥28 wt.-% to ≤48 wt.-%, in particular from ≥35 wt.-% to ≤41 wt.-%, and wherein the solid material, based on the carrier material, is present in an amount from ≥25 wt.-% to ≤65 wt.-%, in particular from ≥33 wt.-% to ≤53 wt.-%, in particular from ≥40 wt.-% to ≤46 wt.-%, and wherein the fiber material, based on the carrier material, is present in an amount from >1 wt.-% to ≤35 wt.-%, in particular from ≥7 wt.-% to ≤30 wt.-%, such as from ≥14 wt.-% to ≤21, and wherein the matrix material, the fiber material and the solid material together, based on the carrier material (20), are present in an amount of ≥89 wt.-%, such as ≥95 wt.-%, in particular ≥97 wt.-%.

On the carrier 12, a printing subsurface 16 is provided, which serves as a subsurface for an in particular printed decorative layer 18. On the decorative layer 18 a covering layer 20 is provided which may be configured multi-layered and may have a structure matching with the decoration of the decorative layer 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A carrier material for producing a carrier for a decorated wall or floor panel, wherein the carrier material comprises a plastic-containing matrix material, a solid material and a fiber material, wherein the solid material, based on the solid material, is formed to at least 50 wt.-% by an inorganic material, wherein the matrix material, based on the carrier material, is present in an amount from ≥20 wt.-% to ≤60 wt.-%, and wherein the solid material, based on the carrier material, is present in an amount from ≥25 wt.-% to ≤65 wt.-%, and wherein the fiber material, based on the carrier material, is present in an amount from >1 wt.-% to ≤35 wt.-%, and wherein the matrix material, the fiber material and the solid material together, based on the carrier material, are present in an amount from ≥89 wt.-%, and wherein the matrix material comprises polypropylene, wherein the polypropylene comprises a mixture of a homopolymer and a copolymer, and wherein the melt flow rate of the homopolymer is greater than that of the copolymer.

2. The carrier material according to claim 1, wherein the fiber material comprises fibers having a length in a range from ≥1 mm to ≤10 mm, wherein the length is greater than the diameter.

3. The carrier material according to claim 1, wherein the fiber material comprises fibers having a diameter in a range of ≤100 µm, wherein the diameter is smaller than the length.

4. The carrier material according to claim 1, wherein the fiber material comprises fibers having a thickness in a range from ≥1 dtex to ≤10 dtex.

5. The carrier material according to claim 1, wherein the fiber material comprises fibers which are selected from the group consisting of plant, animal, mineral and synthetic fibers.

6. The carrier material according to claim 5, wherein the fiber material comprises plastic fibers, wherein the melting temperature of the plastic fibers is higher than the melting temperature of the matrix material.

7. The carrier material according to claim 1, wherein the matrix material comprises talcum.

8. The carrier material according to claim 1, wherein the homopolymer, based on the polypropylene, is present in a proportion from ≥10 wt.-% to ≤40 wt.-%, and/or that the copolymer, based on the polypropylene, is present in a proportion from ≥60 wt.-% to ≤90 wt.-%.

9. The carrier material according to claim 1, wherein the matrix material comprises a mixture of polypropylene and polyethylene.

10. A decorated panel, comprising a carrier and a decorative layer applied onto the carrier, wherein in particular a covering layer provided with a structure is applied on the decorative layer, wherein the carrier comprises a carrier material according to claim 1.

11. A method for producing a decorated wall or floor panel, comprising the method steps:
- a) providing a pourable carrier material according to claim 1;
- b) placing the carrier material between two belt conveyors;
- c) forming the carrier material under the action of temperature and pressure while forming an in particular web-shaped carrier;
- d) optionally cooling the carrier;
- e) optionally applying a decorative subsurface onto at least a portion of the carrier;
- f) applying a decorative layer replicating a decoration template onto at least a portion of the carrier; and
- g) applying a covering layer onto at least a portion of the decorative layer.

12. The method according to claim 11, wherein method step a) includes the processing of a raw material mixture in an extruder.

13. The method according to claim 12, wherein method step a) includes that a prefabricated composite material of the fiber material and the matrix material is introduced into the extruder and is processed in the extruder with the solid material as a raw material mixture.

14. The method according to claim 12, wherein method step a) includes that the matrix material, the fiber material and the solid material are each introduced as an independent phase into an extruder and are processed therein as raw material mixture.

* * * * *